United States Patent [19]

Davis

[11] Patent Number: 5,081,578

[45] Date of Patent: Jan. 14, 1992

[54] ARBITRATION APPARATUS FOR A PARALLEL BUS

[75] Inventor: Timothy R. Davis, Denver, Colo.

[73] Assignee: NCR Corporation, Dayton, Ohio

[21] Appl. No.: 432,422

[22] Filed: Nov. 3, 1989

[51] Int. Cl.[5] .............................................. G06F 13/36
[52] U.S. Cl. .................................. 395/325; 364/242.7;
364/242.92; 364/DIG. 1
[58] Field of Search ... 364/200 MS File, 900 MS File

[56] References Cited

U.S. PATENT DOCUMENTS

| | | | |
|---|---|---|---|
| 4,229,791 | 10/1980 | Levy et al. .......................... | 364/200 |
| 4,320,467 | 3/1982 | Glass .................................... | 364/900 |
| 4,381,542 | 4/1983 | Binder et al. ......................... | 364/200 |
| 4,467,418 | 8/1984 | Quinquis ............................. | 364/200 |
| 4,473,880 | 9/1984 | Budde et al. ......................... | 364/200 |
| 4,499,538 | 2/1985 | Finger et al. ......................... | 364/200 |
| 4,620,278 | 10/1986 | Ellsworth et al. .................. | 364/200 |
| 4,646,232 | 2/1987 | Chang et al. ......................... | 364/200 |
| 4,706,082 | 11/1987 | Miesterfeld et al. .............. | 340/825.5 |
| 4,719,458 | 1/1988 | Miesterfeld et al. .............. | 340/825.5 |
| 4,734,696 | 3/1988 | Rogers .............................. | 340/825.510 |
| 4,785,394 | 11/1988 | Fischer ................................ | 364/200 |
| 4,787,033 | 11/1988 | Bomba et al. ....................... | 364/200 |
| 4,791,563 | 12/1988 | Kling .................................... | 364/200 |

Primary Examiner—Thomas M. Heckler
Attorney, Agent, or Firm—Wilbert Hawk, Jr.; Stephen F. Jewett; Jack R. Penrod

[57] ABSTRACT

An arbitration circuit especially useful for SCSI-II applications, but also having other applications. The basic arbitration circuit requires only thirty NOR gates, one inverter, and connection to all but the lowest priority data line in order to have an arbitration circuit for sixteen lines. The basic circuit will arbitrate among up to sixteen units and is extremely compact and could be used on SCSI related integrated circuits in addition to other SCSI circuitry. The basic arbitration apparatus may also be expanded to accommodate a thirty-two line SCSI-II bus by extending the number of stages to thirty-two.

19 Claims, 3 Drawing Sheets

ARBITRATION APPARATUS FOR A PARALLEL BUS

BACKGROUND OF THE INVENTION

The present invention relates to an arbitration apparatus for use with a parallel bus, and more particularly to a circuit for arbitrating among units of a parallel bus system conforming to ANSI X3T9.2, which is commonly known as SCSI-II. Each arbitrating unit, in such case, is an enhanced small computer system interfaces as defined by ANSI X3T9.2.

High speed parallel buses which interconnect numerous "intelligent" devices, quite often find two or more of those intelligent devices contending for the common single high speed parallel bus. As a consequence, in high speed parallel bus systems some type of priority and arbitration arrangement is necessary to time share the bus in a predictable and orderly manner. One often used priority method is to assign each device on the common bus a unique priority. The SCSI bus defined by ANSI X3.131-1986, published by the American National Standards Institute, New York, N.Y., uses such an approach.

For a SCSI bus system, each unit is assigned a priority. Usually this priority does not change although it is possible for priorities to be dynamically assigned as long as each resulting priority is unique. According to the SCSI standard mentioned previously, for a fundamental arbitration, there are only as many identification numbers or priorities available for assignment as there are data lines. For a SCSI bus, that means that there are only eight priorities available, since there are only eight data lines. After a bus free cycle, every SCSI bus unit which would like to effect a data transfer in the next data cycle drives or asserts a data line corresponding to its priority. Since there is no central arbitration network, each unit taking part in the arbitration for the next bus cycle must decide for itself whether it lost the previous arbitration, or whether it won the previous arbitration and therefore should prepare to transfer information. Circuits which will arbitrate among eight units for an eight line SCSI bus are known.

A SCSI-II bus may have more than eight lines, for example, it may have sixteen or thirty-two lines. The first problem that a SCSI-II bus system must solve, is the increase of the number of possible assigned priorities from eight to sixteen, or thirty-two. A higher number of priorities means a higher number of inputs to each arbitration circuit. A higher number of inputs usually means a bigger, more complex circuit to arbitrate among the inputs.

A second problem encountered by a SCSI-II bus system is how to keep the more complex arbitration system small, so it may be easily included on LSI/VLSI integrated circuits with other SCSI-II related circuitry.

A third problem encountered by a SCSI-II bus system is how to provide the won/lost arbitration result within the 2.2 microsecond minimum waiting time allotted by the proposed SCSI-II standard mentioned above.

Another problem encountered by a SCSI-II bus system is that it may be desirable to use older SCSI units with an enhanced system. A provision for upward compatibility between SCSI and SCSI-II is very desirable.

It is an object of the present invention to provide an arbitration circuit having at least fifteen inputs for connection to a bus having sixteen or greater data lines.

It is another object of the invention to provide a simple, compact arbitration circuit.

It is another object of the invention to provide an arbitration circuit which will produce an arbitration result from at least sixteen units arbitrating for the bus.

It is a further object of the invention to provide an arbitration circuit which is upward compatible with units designed for eight line SCSI buses.

SUMMARY OF THE INVENTION

Briefly stated, the foregoing objects are achieved by providing an arbitration circuit apparatus that is made up of individual arbitration stages. Except for the first stage which only has a local input, each arbitration stage has a first logic gate which is connected at one input to the output of the previous stage and a second input that may be connected to a remote unit having a priority level corresponding to its stage level, and a second logic gate which has a first input connected to the output of the first logic gate for that stage and a second input which may be connected to an input from a local unit associated with the arbitration apparatus. The output of each stage is connected to an input of the first gate of the next stage. With this arrangement, a local input when asserted will propagate through all stages above its input stage level until it is disabled from further propagating by an assertion of a connected remote input having a higher priority. The rules of the arbitration require that only one input, either local or remote, may be asserted at any one level. Otherwise, under some conditions, two units might respond as if each had the highest priority. The first gate is left off of the first stage as a simplification since there is no lower stage to disable the propagation of logic levels from.

In accordance with one embodiment of the invention, the foregoing objects are achieved by providing an arbitration apparatus for arbitrating among N levels of priority, where N is an integer. The invention includes a lowest stage, further including an inverter having a lowest priority local input and a lowest stage output; N arbitration stages corresponding to N levels of priority, each stage further including a first, two input NOR gate having a first input connected to the output of the immediately lower stage, a second input connected to a remote input with a priority corresponding to its respective stage level, and a first NOR gate output; and a second two input NOR gate having a first input connected to said first NOR gate output of the respective stage, a second input for connection to a local input with a priority corresponding to its respective stage level, and a second NOR gate output that is the output of the respective stage. The output of the second NOR gate of the Nth stage is the output terminal for the entire priority circuit. The output terminal indicates by a LOW logic level thereon that a connected local input has asserted a higher priority than the priority asserted by any lower remote input, or by a HIGH logic level thereon that one of the remote inputs has asserted a higher priority than the priority of any connected lower local input.

Various objects appear from the foregoing summary of the invention. Other objects and further scope of applicability of the present invention will appear from the following detailed description. It should be understood that the detailed description indicates one or more embodiments of the invention and are given by way of illustration only since changes and modifications may be made within the spirit and scope of the invention.

BRIEF DESCRIPTION OF THE DRAWINGS

While the specification concludes with claims particularly pointing out and distinctly claiming the subject matter which is regarded as the invention, it is believed that the invention will be better understood from the following detailed description of the illustrative embodiment taken in conjunction with the accompanying drawings wherein like reference numbers indicate like, components.

DETAILED DESCRIPTION OF A PREFERRED EMBODIMENT

Figure 1:
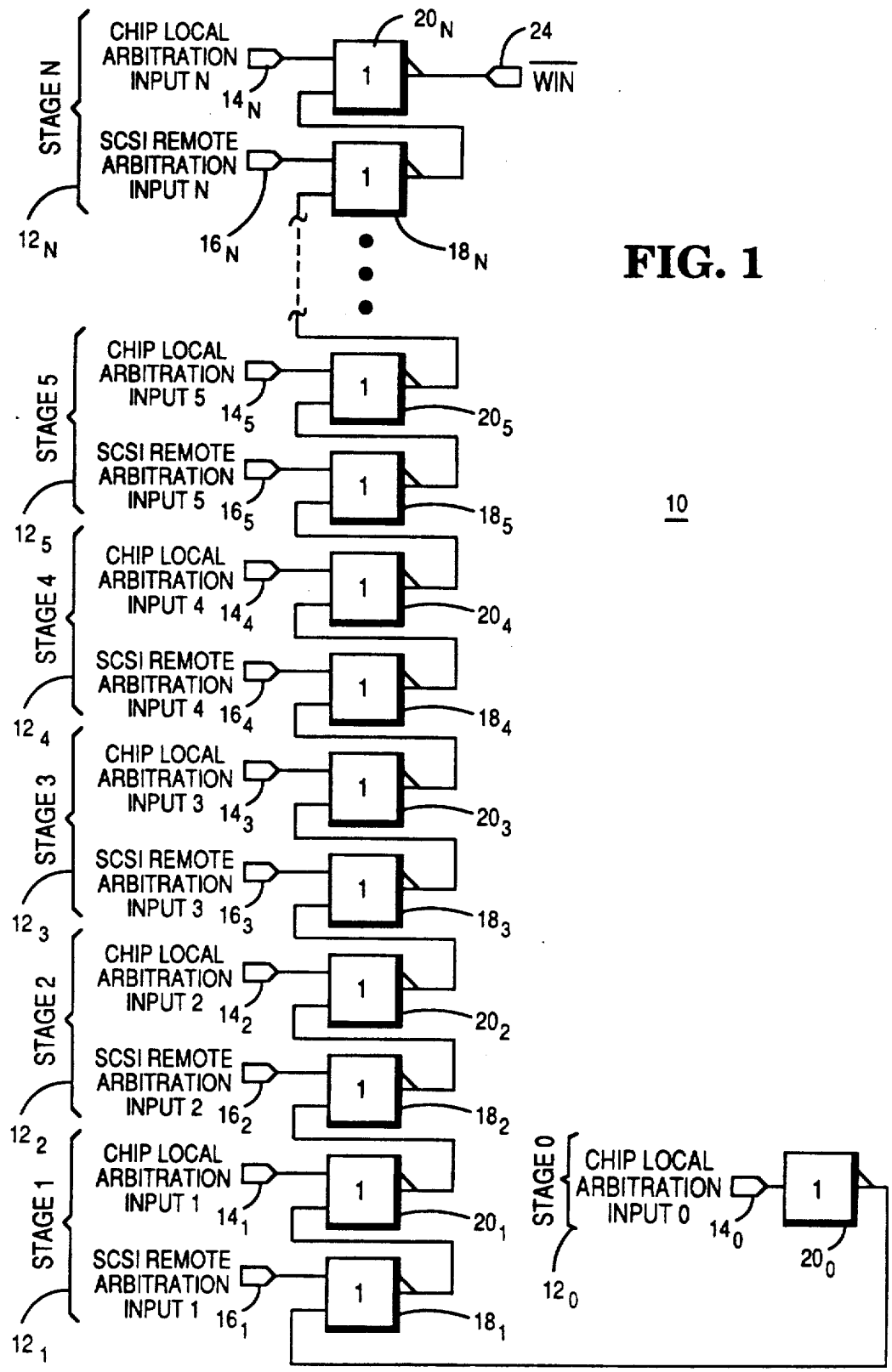
FIG. 1 is a block diagram, illustrating one embodiment of the arbitration apparatus.

Referring to FIG. 1, a block diagram of one embodiment of an arbitration circuit 10, according to the invention, is shown. The arbitration circuit 10 has stages 0 to N, all of which are identical, except for the very first stage. As will be explained, the arbitration circuit 10 provides $N+1$ priority and arbitration levels. For an SCSI bus system having eight parallel data lines, N usually is equal to seven, and for a SCSI-II bus systems having sixteen and thirty-two parallel data lines, N usually is equal to fifteen and thirty-one, respectively. However, the arbitration circuit 10 may have as many stages as desired in a non-SCSI application.

Each stage $12_0$–$12_N$ has a local input $14_0$–$14_N$. In a very simple arrangement only one of the local inputs $14_0$–$14_N$ is actively connected. For the case where each local device has an arbitration circuit 10, each local device has a different local input $14_0$–$14_N$, $N+1$ unique priority levels would be possible. Each local device is required to have a unique priority according to ANSI X3T9.2, so this simple arrangement fulfills the the requirements. In this simple arrangement, the priority of each local device that the circuit 10 arbitrates for will be preselected and a permanent connection will be made at that time. Once one local input has been preselected, all other local inputs $14_0$–$14_N$ are locally connected to fixed non-asserted logic levels. Alternatively, the local inputs $14_0$–$14_N$ could be connected to a switch, such as a $N+1$ pole dual-in-line switch, that lets an operator manually select the priority by switch openings and closures, or by an $N+1$ bit register which may be dynamically switched by the local device. If a dynamically switchable arrangement is used, care must be taken to coordinate the dynamic assignments in order to assure that each priority in the SCSI/SCSI-II system is unique. Such dynamic arrangements and assignments are within the skill of an average worker in the art.

The upper N stages $12_1$–$12_N$ each have a SCSI/SCSI-II remote input $16_1$–$16_N$ respectively in addition to the local input $14_1$–$14_N$. The remote priority signals to the inputs $16_1$–$16_N$ are carried by data lines of the SCSI/SCSI-II bus system (not shown) and since these data lines are always connected to the local SCSI/SCSI-II device, it is a simple matter to make the electrical connection to the remote inputs $16_1$–$16_N$ of the arbitration circuit 10 from the data lines. In the preferred embodiment, this connection is made via inverting buffers (not shown).

Each of the upper stages $12_1$–$12_N$ preferably has a two input NOR gate $18_1$–$18_N$ and a second two input NOR gate $20_1$–$20_N$, although those skilled in the art will recognize that other arrangements of combinational logic gates may be used to effect the same logical results. All such combinations which fall within the scope of the claims are deemed to be part of the invention. The lowest stage $12_0$ is a single input logic gate $20_0$ which may be any gate which does a logical complementing operation such as an inverter, a NOR gate, or a NAND gate with all of its inputs tied in common.

The local input $14_0$, is connected to the gate $20_0$ of stage $12_0$. The output of gate $20_0$ is connected to one input of gate $18_1$ of stage $12_1$. The remote input $16_1$ is the second input to the two input NOR gate $18_1$. The output of the two input NOR gate $18_1$ is connected to one input of two input NOR gate $20_1$. The local input $14_1$ is the second input of the two input NOR gate $20_1$. The output of the two input NOR gate $20_1$ is the output of stage 1 and is connected to one of the inputs of the next higher priority stage, i.e. stage $12_2$. Each succeeding stage is connected in the same manor as stage 1 except for stage $12_N$, the terminal stage. The output 24 of stage $12_N$ carries a logic signal (after taking into account all gate propagation delays) which indicates whether the local SCSI/SCSI-II device associated with the arbitration circuit 10 has a priority greater than that of any remote device during the arbitration cycle.

Each stage $12_0$–$12_N$ has a respective local input $14_0$–$14_N$. The priority of the input in arbitration corresponds to its stage level: the higher the stage level, the higher the priority of the corresponding local input $14_0$–$14_N$. Additionally, according to SCSI/SCSI-II requirements, each level is unique, e.g. there is only one SCSI/SCSI-II device to arbitrate at each priority level. This means that each stage shown in FIG. 1 may have one active local input $14_0$–$14_N$ and the others will be physically or logically disconnected, such as being driven to a LOW logic level by the local device (not shown) that arbitration circuit 10 is associated with.

An asserted HIGH logic level on one of the inputs $14_0$–$14_N$ will induce a LOW logic level at the output of its respective stage $12_0$–$12_N$. This LOW level will propagate through each higher priority stage if that propagation is not disabled by an asserted HIGH logic level on any higher priority remote inputs $18_1$–$18_N$. If a LOW local level from a local $20_1$–$20_N$ is not disabled, it will propagate through all the higher arbitration stages and will result in a logic LOW at the WIN output terminal 24, indicating that the local device associated with the arbitration circuit 10 has won the arbitration for the next bus information cycle.

Since at most one SCSI/SCSI-II device is assigned to each priority level during each arbitration cycle, the circuitry of the lowest priority stage may be simplified. The reasoning is that if the local device has the lowest priority and no other device has it, then there is no need for any other arbitration circuit 10 to arbitrate at the lowest level because all remote priorities will be greater than the lowest level. Further, if a remote device has the lowest priority level, then all other arbitrating devices must have higher priorities and therefore it is not necessary to have a disable gate and a remote input line at the lowest priority level.

Thus, stage $12_0$ may be greatly simplified as shown.

The enable/disable gates $18_1$–$18_N$ do more than simply disable lower local priority arbitration results from propagating to the output terminal 24. Additionally, enable/disable gates $18_1$–$18_N$ when driven by logic HIGHs on their respective remote inputs $16_1$–$16_N$ will result in a respective logic HIGH propagating through the higher level stages up to the WIN terminal 24. A logic HIGH at terminal 24 indicates that the local device has not won the arbitration for the next bus information cycle. A logic HIGH result out of one of the enable/disable NOR gates $18_1$–$18_N$ will propagate to the output terminal 24 unless it is disabled by a higher priority HIGH input on one of the local inputs $14_1$–$14_N$.

Thus, the output 24 will be a logic LOW, indicating that the local device associated with the arbitration circuit 10 has won the arbitration, when its connected local input has a higher priority level than any of the remote inputs. Otherwise, the output 24 will be a logic HIGH indicating that the local device has not won the arbitration because some remote device has asserted a logic HIGH on a higher priority level remote input than the priority level of the local input.

Figure 2A:
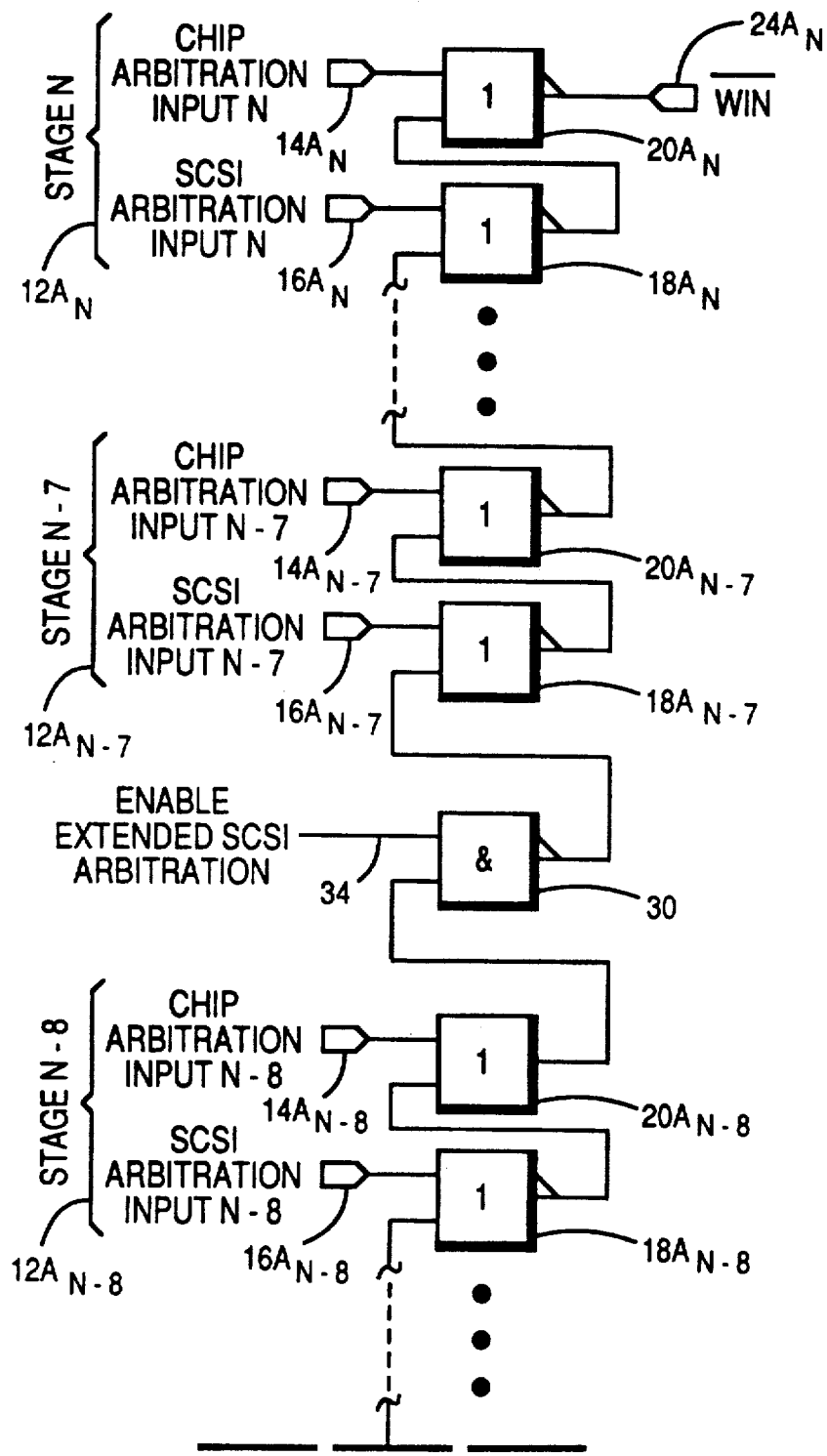
FIGS. 2A and 2B together form a block diagram illustrating a second embodiment of the invention.
Figure 2B:
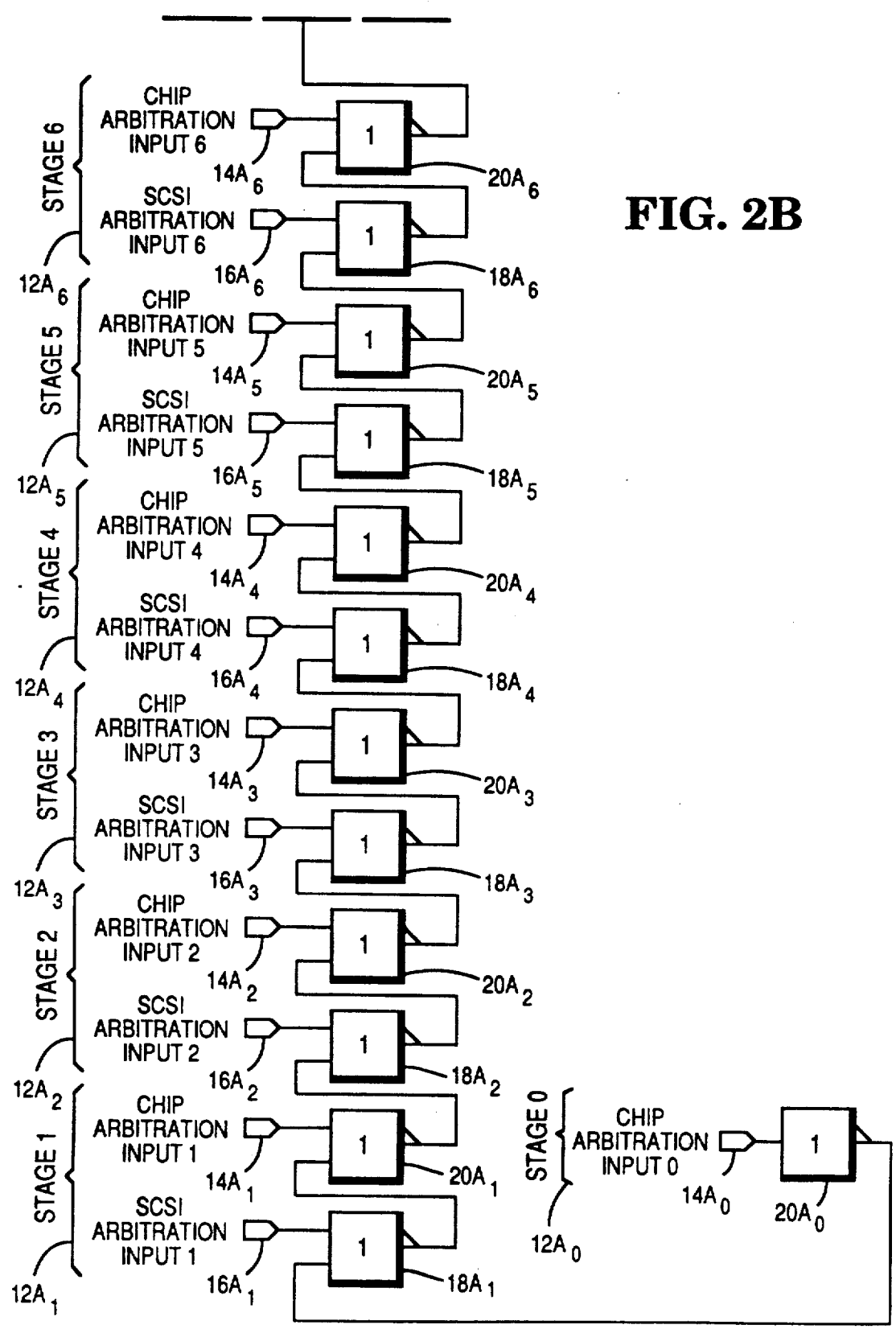

Referring now to FIGS. 2A and 2B, a second arbitration circuit 10A is shown. This second arbitration circuit 10A is identical to the circuit shown in FIG. 1, except that gate $20A_{N-8}$ is and its output connects to a NAND gate 30 having an enable extended SCSI-II arbitration input 34. When the input 34 is driven with a logic HIGH, extended arbitration is enabled and the output of the combination of gates $20A_{N-8}$ and gate 30 will be the logical equivalent of the corresponding NOR gate $20_{N-8}$ (not shown) of the first embodiment. There will, however, be one additional gate delay time before the output signal is propagat next stage $12A_{N-7}$. Similarly, if the enable extended SCSI arbitration input 34 is driven with a logical LOW, then the output of gate 30 will be a logic HIGH and the effect will be as if stages 0 through N-8, gate 30, and gate $18A_{N-7}$ of the arbitration circuit 10A were disconnected, and the input to gate $20A_{N-7}$ removed. Thus, the additional gate 30 provides the arbitration circuit 10A with the ability to ignore the output of stages $12A_0$–$12_{N-8}$ when interfacing to a SCSI bus system having eight bit arbitration.

Thus, it will now be understood that there has been disclosed an arbitration circuit which provides arbitration among devices of a SCSI/SCSI-II or similar bus system. While the invention has been particularly illustrated and described with reference to a preferred embodiment thereof, it will be understood by those skilled in the art that various changes in form, details, and applications may be made therein. For example, an insertion of enable extended arbitration gate 30 and a change of the previous NOR gate to an OR gate, may be made anywhere along the arbitration circuit 10A. It is accordingly intended that the appended claims shall cover all such changes in form, details and applications which do not depart from the true spirit and scope of the invention.

What is claimed as new and desired to be secured by Letters Patent of the United States is:

1. An electronic apparatus having a plurality of stages corresponding to a plurality of priority levels and an output terminal, said apparatus for arbitrating between a local bus interface and at least one remote bus interface comprising:

lowest stage means having a lowest priority input for propagating to said output terminal via a serial connection of the remainder of said plurality of stages a local arbitration input signal to indicate that said local bus interface has won the arbitration; and each of the remainder of said plurality of stages connected between said lowest stage and said output terminal including a remote priority means for blocking the propagation from a lower priority level of any arbitration signal to indicate that said local bus interface has won the arbitration, and propagating a remote input signal upon assertion thereof indicating that a remote bus interface has won the arbitration, and a local priority means for propagating the arbitration signal from said remote priority means towards said output terminal unless said local bus interface asserts a higher priority local arbitration input signal to said local priority means to indicate that said local bus interface has won the arbitration and propagates said higher priority level local arbitration signal towards said output terminal.

2. An arbitration apparatus for arbitrating among N+1 levels of priority, where N is an integer, comprising:

a lowest stage, including an inverter having a lowest priority local input and a lowest stage output;

N arbitration stages corresponding to N levels of priority, each stage including a first two input NOR gate having a first input connected to the output of the immediately lower stage, a second input connected to a remote input with a priority corresponding to a respective stage level, and a first NOR gate output; and a second two input NOR gate having a first input connected to said first NOR gate output of the respective stage, a second input for connection to a local input with a priority corresponding to the respective stage level, and a second NOR gate output that is the output of the respective stage; and an output terminal connected to the Nth stage that indicates by a LOW logic level that a connected local input has asserted a higher priority than asserted by any remote input and by a HIGH logic level that one remote input has asserted a higher priority than any connected local input.

3. The arbitration apparatus according to claim 2, wherein the integer N is equal to seven.

4. The arbitration apparatus according to claim 2, wherein the integer N is equal to fifteen.

5. The arbitration apparatus according to claim 2, wherein the integer N is equal to thirty-one.

6. For use in a system having a local unit and a plurality of remote units which may compete for a common bus, an arbitration apparatus, comprising:

a first gate having an input for connection to the local unit;

a second gate having a first input connected to an output of said first gate and a second input for connection to a first remote unit having a first priority;

a third gate having a first input connected to an output of said second gate and a second input for connection to a second connection of said local unit;

a fourth gate having a first input connected to an output of said third gate and a second input for connection to a second remote unit having a second priority;

a fifth gate having a first input connected to an output of said third gate and a second input for connection to a third connection of said local unit;

a sixth gate having a first input connected to an output of said fifth gate and a second input for connection to a third remote unit having a third priority;

a seventh gate having a first input connected to an output of said sixth gate and a second input for connection to a fourth connection of said local unit;

an eighth gate having a first input connected to an output of said seventh gate and a second input for connection to a fourth remote unit having a fourth priority;

a ninth gate having a first input connected to an output of said eighth gate and a second input for connection to a fifth connection of said local unit;

a tenth gate having a first input connected to an output of said ninth gate and a second input for connection to a fifth remote unit having a fifth priority;

an eleventh gate having a first input connected to an output of said tenth gate and a second input for connection to a sixth connection of said local unit;

a twelfth gate having a first input connected to an output of said eleventh gate and a second input for connection to a sixth remote unit having a sixth priority;

a thirteenth gate having a first input connected to an output of said twelfth gate and a second input for connection to a seventh connection of said local unit;

a fourteenth gate having a first input connected to an output of said thirteenth gate and a second input for connection to a seventh remote unit having a seventh priority;

a fifteenth gate having a first input connected to an output of said fourteenth gate and a second input for connection to an eighth connection of said local unit;

a sixteenth gate having a first input connected to an output of said fifteenth gate and a second input for connection to an eighth remote unit having an eighth priority;

a seventeenth gate having a first input connected to an output of said sixteenth gate and a second input for connection to a ninth connection of said local unit;

an eighteenth gate having a first input connected to an output of said seventeenth gate and a second input for connection to a ninth remote unit having a ninth priority;

a nineteenth gate having a first input connected to an output of said eighteenth gate and a second input for connection to a tenth connection of said local unit;

a twentieth gate having a first input connected to an output of said nineteenth gate and a second input for connection to a tenth remote unit having a tenth priority;

a twenty-first gate having a first input connected to an output of said twentieth gate and a second input for connection to an eleventh connection of said local unit;

a twenty-second gate having a first input connected to an output of said twenty-first gate and a second input for connection to an eleventh remote unit having an eleventh priority;

a twenty-third gate having a first input connected to an output of said twenty-second gate and a second input for connection to a twelfth connection of said local unit;

a twenty-fourth gate having a first input connected to an output of said twenty-third gate and a second input for connection to a twelfth remote unit having a twelfth priority;

a twenty-fifth gate having a first input connected to an output of said twenty-fourth gate and a second input for connection to a thirteenth connection of said local unit;

a twenty-sixth gate having a first input connected to an output of said first gate and a second input for connection to a thirteenth remote unit having a thirteenth priority;

a twenty-seventh gate having a first input connected to an output of said twenty-sixth gate and a second input for connection to a fourteenth connection of said local unit;

a twenty-eighth gate having a first input connected to an output of said twenty-seventh gate and a second input for connection to a fourteenth remote unit having a fourteenth priority;

a twenty-ninth gate having a first input connected to an output of said twenty-eighth gate and a second input for connection to a fifteenth connection of said local unit;

a thirtieth gate having a first input connected to an output of said twenty-ninth gate and a second input for connection to a fifteenth remote unit having a fifteenth priority; and a thirty-first gate having a first input connected to an output of said thirtieth gate and a second input for connection to a sixteenth connection of said local unit;

said thirty-first gate having an output with a logic signal level which indicates to said local unit whether it is the highest priority unit among the units arbitrating for the system bus.

7. The arbitration apparatus according to claim 6, wherein said first gate is a single input logic inverter.

8. The arbitration apparatus according to claim 6, wherein said first gate is a single input NOR gate.

9. The arbitration apparatus according to claim 6, wherein said first gate is a single input NAND gate.

10. The arbitration apparatus according to claim 7, wherein all of said gates, except said first gate, are NOR gates having two inputs.

11. The arbitration apparatus according to claim 8, wherein all of said gates, except said first gate, are NOR gates having two inputs.

12. The arbitration apparatus according to claim 9, wherein all of said gates, except said first gate, are NOR gates having two inputs.

13. For use in a system having a local unit and a plurality of remote units which may compete for a common bus, an arbitration apparatus, comprising:

a first gate having an input for connection to the local unit;

a second gate connected to an output of said first gate and a second input for connection to a first remote unit having a first priority;

a third gate having a first input connected to an output of said second gate and a second input for connection to a second connection of said local unit;

a fourth gate having a first input connected to an output of said third gate and a second input for connection to a second remote unit having a second priority;

a fifth gate having a first input connected to an output of said third gate and a second input for connection to a third connection of said local unit;

a sixth gate having a first input connected to an output of said fifth gate and a second input for connection to a third remote unit having a third priority;

a seventh gate having a first input connected to an output of said sixth gate and a second input for connection to a fourth connection of said local unit;

an eighth gate having a first input connected to an output of said seventh gate and a second input for connection to a fourth remote unit having a fourth priority;

a ninth gate having a first input connected to an output of said eighth gate and a second input for connection to a fifth connection of said local unit;

a tenth gate having a first input connected to an output of said ninth gate and a second input for connection to a fifth remote unit having a fifth priority;

an eleventh gate having a first input connected to an output of said tenth gate and a second input for connection to a sixth connection of said local unit;

a twelfth gate having a first input connected to an output of said eleventh gate and a second input for connection to a sixth remote unit having a sixth priority;

a thirteenth gate having a first input connected to an output of said twelfth gate and a second input for connection to a seventh connection of said local unit;

a fourteenth gate having a first input connected to an output of said thirteenth gate and a second input for connection to a seventh remote unit having a seventh priority;

a fifteenth gate having a first input connected to an output of said fourteenth gate and a second input for connection to an eighth connection of said local unit;

a sixteenth gate having a first input connected to an output of said fifteenth gate and a second input for connection to an enable signal enabling arbitration with remote units with priorities higher than seven;

a seventeenth gate having a first input connected to an output of said sixteenth gate and a second input for connection to an eighth remote unit having an eighth priority;

an eighteenth gate having a first input connected to an output of said seventeenth gate and a second input for connection to a ninth connection of said local unit;

a nineteenth gate having a first input connected to an output of said eighteenth gate and a second input for connection to a ninth remote unit having a ninth priority;

a twentieth gate having a first input connected to an output of said nineteenth gate and a second input for connection to a tenth connection of said local unit;

a twenty-first gate having a first input connected to an output of said twentieth gate and a second input for connection to a tenth remote unit having a tenth priority;

a twenty-second gate having a first input connected to an output of said twenty-second gate and a second input for connection to an eleventh connection of said local unit;

a twenty-third gate having a first input connected to an output of said twenty-second gate and a second input for connection to an eleventh remote unit having an eleventh priority;

a twenty-fourth gate having a first input connected to an output of said twenty-third gate and a second input for connection to a twelfth connection of said local unit;

a twenty-fifth gate having a first input connected to an output of said twenty-fourth gate and a second input for connection to a twelfth remote unit having a twelfth priority;

a twenty-sixth gate having a first input connected to an output of said twenty-fifth gate and a second input for connection to a thirteenth connection of said local unit;

a twenty-seventh gate having a first input connected to an output of said first gate and a second input for connection to a thirteenth remote unit having a thirteenth priority;

a twenty-eighth gate having a first input connected to an output of said twenty-seventh gate and a second input for connection to a fourteenth connection of said local unit;

a twenty-ninth gate having a first input connected to an output of said twenty-eighth gate and a second input for connection to a fourteenth remote unit having a fourteenth priority;

a thirtieth gate having a first input connected to an output of said twenty-ninth gate and a second input for connection to a fifteenth connection of said local unit;

a thirty-first gate having a first input connected to an output of said thirtieth gate and a second input for connection to a fifteenth remote unit having a fifteenth priority;

a thirty-second gate having a first input connected to an output of said thirty-first gate and a second input for connection to a sixteenth connection of said local unit;

said thirty-second gate having an output with a logic signal level which indicates to said local unit whether it is the highest priority unit among the units arbitrating for the system bus whenever said enable signal is at a logic low level.

14. The arbitration apparatus according to claim 13, wherein said first gate is a single input logic inverter and said sixteenth gate is a two input OR gate.

15. The arbitration apparatus according to claim 13, wherein said first gate is a single input NOR gate and said sixteenth gate is a two input OR gate.

16. The arbitration apparatus according to claim 13, wherein said first gate is a single input NAND gate and said sixteenth gate is a two input OR gate.

17. The arbitration apparatus according to claim 14, wherein all of said gates, except said first gate and said sixteenth gate, are NOR gates having two inputs.

18. The arbitration apparatus according to claim 15, wherein all of said gates, except said first gate and said sixteenth gate, are NOR gates having two inputs.

19. The arbitration apparatus according to claim 16, wherein all of said gates, except said first gate and said sixteenth gate, are NOR gates having two inputs.

* * * * *